(12) United States Patent
Van et al.

(10) Patent No.: US 11,157,901 B2
(45) Date of Patent: Oct. 26, 2021

(54) SYSTEMS AND METHODS FOR INITIALIZATION AND ACTIVATION OF SECURE ELEMENTS

(71) Applicant: DREAM PAYMENTS CORP., Toronto (CA)

(72) Inventors: Long Van, North York (CA); Sergey Nekipelyy, Oakville (CA)

(73) Assignee: DREAM PAYMENTS CORP., Toronto (CA)

( * ) Notice: Subject to any disclaimer, the term of this patent is extended or adjusted under 35 U.S.C. 154(b) by 640 days.

(21) Appl. No.: 15/652,110

(22) Filed: Jul. 17, 2017

(65) Prior Publication Data

US 2018/0018663 A1 Jan. 18, 2018

Related U.S. Application Data

(60) Provisional application No. 62/363,746, filed on Jul. 18, 2016.

(51) Int. Cl.
*G06Q 20/38* (2012.01)
*H04W 12/04* (2021.01)
(Continued)

(52) U.S. Cl.
CPC ..... *G06Q 20/3829* (2013.01); *G06Q 20/3552* (2013.01); *G07F 7/0873* (2013.01);
(Continued)

(58) Field of Classification Search
CPC .................. G06Q 20/00–425; H04L 9/00–38
See application file for complete search history.

(56) References Cited

U.S. PATENT DOCUMENTS 8,297,520 B1 * 10/2012 Wakerly .............. G06Q 20/352
235/492
10,084,604 B2 * 9/2018 Burghardt ............. H04L 9/3234
(Continued)

FOREIGN PATENT DOCUMENTS

EP 2 461 613 A1 6/2012

OTHER PUBLICATIONS

The International Search Report and the Written Opinion of the International Searching Authority, dated Oct. 2, 2017, in corresponding International Application No. PCT/CA2017/050865, 8 pages.
(Continued)

*Primary Examiner* — John W Hayes
*Assistant Examiner* — Taylor S Rak
(74) *Attorney, Agent, or Firm* — Foley & Lardner LLP

(57) ABSTRACT

Disclosed herein are secure transaction systems having secure elements that are initialized and activated independent from each other. The secure element is first initialized to make the secure element turn to a state in which the secure element can be packaged, sold within retail stores, and then injected with encryption keys. The initialization process of the secure element formulates the secure element to ensure trust between the secure elements and secure element activation servers. The process of independently initializing and activating the secure elements while still addressing the security protocols allows the secure element to be packaged and sold within retail stores after initialization, and then activating the secure element at a later date and time when the secure element is ready to be used by a merchant.

12 Claims, 7 Drawing Sheets

(51) Int. Cl.

| | |
|---|---|
| *G06Q 20/34* | (2012.01) |
| *G07F 7/08* | (2006.01) |
| *H04L 9/14* | (2006.01) |
| *H04L 9/32* | (2006.01) |
| *H04W 12/30* | (2021.01) |
| *H04L 29/06* | (2006.01) |
| *H04W 12/06* | (2021.01) |
| *H04W 4/70* | (2018.01) |
| *H04L 9/08* | (2006.01) |

(52) U.S. Cl.
CPC .............. *H04L 9/14* (2013.01); *H04L 9/3234* (2013.01); *H04L 9/3263* (2013.01); *H04L 9/3265* (2013.01); *H04W 12/04* (2013.01); *H04W 12/35* (2021.01); *H04L 9/08* (2013.01); *H04L 9/3213* (2013.01); *H04L 63/06* (2013.01); *H04L 63/083* (2013.01); *H04L 63/0823* (2013.01); *H04L 63/0869* (2013.01); *H04W 4/70* (2018.02); *H04W 12/06* (2013.01)

(56) References Cited

U.S. PATENT DOCUMENTS

| | | | |
|---|---|---|---|
| 2005/0120205 | A1 | 6/2005 | Umezawa et al. |
| 2007/0095927 | A1 | 5/2007 | Pesonen |
| 2013/0232083 | A1* | 9/2013 | Smith .................. G06Q 20/355 |
| | | | 705/67 |
| 2013/0266140 | A1 | 10/2013 | Wall et al. |
| 2014/0172741 | A1* | 6/2014 | Liu ....................... G06F 21/606 |
| | | | 705/342 |
| 2014/0273973 | A1 | 9/2014 | Jeon et al. |
| 2015/0149776 | A1* | 5/2015 | Chastain ............... H04L 9/0877 |
| | | | 713/169 |
| 2015/0220319 | A1 | 8/2015 | Weiss et al. |
| 2015/0220391 | A1 | 8/2015 | Chilappagari et al. |
| 2016/0344560 | A1* | 11/2016 | Caceres ................ H04L 9/3268 |

OTHER PUBLICATIONS

Extended European Search Report issued in EP 17830148.7 dated May 25, 2020.

* cited by examiner

SYSTEMS AND METHODS FOR INITIALIZATION AND ACTIVATION OF SECURE ELEMENTS

CROSS-REFERENCE TO RELATED APPLICATIONS

This application is a non-provisional patent application that claims benefit of U.S. Provisional Patent Application Ser. No. 62/363,746, filed Jul. 18, 2016, which is hereby incorporated by reference herein in their entirety.

TECHNICAL FIELD

This application relates generally to secure communication and/or transaction systems, and in particular relates to initialization and activation of secure elements for use within terminal devices.

BACKGROUND

The evolution of e-commerce has seen the emergence of secure element chip technology as a solution for a range of commercial and security applications. The secure element chip may be used to provide security for data storage and transactions by serving as secure portable tokens providing digital identity, hardware-based authentication, and cryptographic key storage.

A removable secure element chip can be uniquely associated with a hosting/terminal device as an embedded secure element. In some cases, a secure element chip can be installed in a terminal device, like a mobile communication device, a card reader, a wearable device, a vending machine, or any internet of things (TOT) device. Users may use a terminal device such as a mobile communication device or a card reader for financial transactions, and thereby maybe provisioned with financial and payment capabilities, such as electronic wallets. For a secure handling of financial and payment activities in a terminal device, the terminal device may be provided with the secure elements. The terminal device with the embedded secure element chips store data in a secure element memory and allow for an encrypted communication of the data to provide the users with secure network access and protection from fraud and identity theft, and thereby greater business flexibility. The secure element may further implement procedures established to promote security of information stored in the secure element, such as personal financial information.

However, before secure communications and transactions can take place using a terminal device, a secure element must be installed, initialized, and activated in the terminal device in a manner to prevent untrusted parties from obtaining any of the encryption keys, seed values, or secure data. Typically, several different entities must coordinate for installing, initializing, and activating secure element chips into the terminal devices. For instance, a secure element service provider/vendor produces secure element chips for use in the terminal devices. A terminal device vendor manufactures the terminal devices, such as mobile devices or card readers. A service provider is responsible for managing the terminal device and supporting secure transactions after the terminal device has been distributed to the merchants. A retailer assembles the secure element chips into the terminal devices and distributes the terminal devices to the merchants.

Typically, the process starts with a merchant who requires a terminal device having a secure element. In order to obtain the terminal device having the secure element, the merchant goes through an adjudication process, and after the merchant is adjudicated, the merchant is provisioned with a terminal device. The provisioning of the terminal device to the merchant then goes through a terminal device procurement process. For instance, a secure element vendor first manufactures secure element chips containing initial keys for use in the terminal devices. A service provider then generates master keys, stores a copy of the master keys in a database, and then securely transmits the master keys to the secure element vendor. The terminal device is then sent to a secure injection facility in a secure warehouse where the terminal device is connected to a wired terminal where the master keys received from the service provider are injected to initialize and activate the secure element chips. Once the keys are injected in the terminal device, the terminal device then has to be securely shipped to the merchant. In order to ship the terminal device to the merchant, the secure element service provider/vendor sends the terminal device to the retailer so that the retailer can distribute the terminal devices to the merchants.

The conventional distribution model described herein used for installing, initializing, and activating secure element chips into the terminals and then securely shipping the terminal devices to the merchants is inefficient and time consuming when dealing with thousands of merchants. Typically, the turnaround time of securely shipping the terminal device to the merchant is anywhere from few days to a couple of weeks, depending on, a size of the secure injection facility, whether the terminal devices have to be transferred from the secure warehouse to the secure injection facility, etc. In addition, accommodation of a supply chain process of the retailers to deliver the terminal devices to the merchant further adds to a cost of delivering the terminal devices to the end merchant. Accordingly, there remains a need for an efficient and cost-effective process for installing, initializing, and shipping terminal device with a secure element to the merchant.

SUMMARY

Disclosed herein are systems, apparatuses, and methods for secure communication and/or transaction where secure elements are initialized and activated independent of each other, and consequently the systems, apparatuses, and methods for secure communication and/or transaction of the present disclosure are capable of addressing the above-described shortcomings of conventional processes where the secure elements are initialized and activated at a same time because of which the secure elements have to be tracked at every step in a chain of custody and thereby leading to inefficient and expensive distribution process.

In the present disclosure, the secure elements, which may be a card reader, a secure element chip embedded into a mobile phone, a vending machine, a wearable device, or any internet of things (TOT) device, are initialized and activated at different times. In some embodiments, the TOT devices may be devices embedded with electronics, software, sensors, actuators, and network connectivity that are internetworked with each other to enable these devices to collect and exchange data. In some embodiments, each device of the TOT devices may be manufactured by different manufacturers but are able to communicate with each other despite not sharing common application programming interfaces or connection protocols using a unique identifier (for example, a universally unique identifier (UUID) assigned to each of the TOT devices. In operation, a secure element is first initialized to make the secure element turn to a state in which the secure element can be packaged, sold within retail stores, and then injected with encryption keys using wireless communication technologies, such as Wi-Fi or cellular data. The initialization process of the secure element further formulates the secure element in a way to ensure trust between the secure elements and secure element activation servers. The process of independently initializing and activating the secure elements while still addressing the security protocols allows the secure element to be packaged and sold within retail stores after initialization, and then activating the secure element at a later date and time when the secure element is ready to be used leads to reduction of cost of activation and delivery time of the secure elements into the field, as well as providing net new distribution methods to address other business concerns. For instance, the replacement of a failed terminal device hardware in the field has typically been performed by sending a technician to a merchant to have the terminal device hardware swapped. Being able to activate the terminal device hardware in the field may allow for the ability to have secure elements in terminal hardware devices reside at freight forwarding locations to be available for rapid deployment, and then replacement of failed terminal device hardware without the need to send technicians to the merchant.

Embodiments described herein further disclose manufacturing of secure elements that are equipped for a multi-step independent initialization and activation process. The multi-step initialization and activation process allows the secure elements to be packaged, placed on retail store shelves or any warehouse environment, and then sold/delivered to merchants at a later point in time. The merchants are an entity that provides or sells goods and/or services to consumers and, in various embodiments, purchases, orders, and/or employs one or more terminal devices having secure elements. An activation process of the secure elements may be executed using wireless communication technologies, such as Wi-Fi or cellular data where keys are remotely and securely injected within the secure elements. In order to maintain security across the various manufacturing and provisioning stages of the secure elements, the secure elements may be injected with a trusted third party certificate during an initialization phase. Then a public certificate may be generated and signed within the secure element using the third party certificate. The public certificate may be extracted, and used by an authentication server for secure element authentication during the secure element activation phase.

In some embodiments, upon receipt of secure elements at a facility that complies with trusted security standards safeguarding PIN security and key management such as TR39, for example a key injection facility (KIF), the secure elements may be manually connected to a computer based secure element initialization system that is provided by a secure element manufacturer. The computer based secure element initialization system may contain a software program and algorithm provided by the secure element manufacturer that may run a test to check if the secure element is tampered with or not. The test result generated on the execution of the software program and algorithm by the computer system may consist of a pass/fail outcome. The execution of the software program and algorithm by the computer system may then load the secure element on a terminal device such as a mobile device or a card reader with a key being injected into the terminal device. The computer may then save the derived keys from the terminal device onto a database of the secure element initialization system.

During the key injection (KI) process of the secure element, a computer may also prompt an operator to scan a barcode of the terminal device for authentication of the terminal device.

In some embodiments, a method for initialization and activation of a secure element for use in a terminal device may include generating, by at least one service provider server, a set of encryption keys associated with the secure element. The method may further include transmitting, by the at least one service provider server, the set of encryption keys associated with the secure element to a key injection facility server. The method may further include receiving, by the at least one service provider server, a service provider certificate generated by a certification authority server. The method may further include transmitting, by the at least one service provider server, the service provider certificate to the key injection facility server, whereby the key injection facility server stores the set of encryption keys, one or more attributes associated with the secure element, and the service provider certificate into a memory of the secure element. The method may further include authenticating, by the at least one service provider server, an identity of the secure element based on one or more parameters of the service provider certificate. The method may further include generating, by the at least one service provider server, a session with the secure element based on mutual authentication with the secure element using at least the service provider certificate. The method may further include activating, by the at least one service provider server, the secure element of the terminal device by storing at least a master key and a working key into the memory of the secure element.

In some embodiments, a system for initialization and activation of a secure element for use in a terminal device is provided. The system may include a service provider server and an activation server of a service provider. The service provider server is configured to generate a set of encryption keys associated with the secure element. The service provider server is further configured to transmit the set of encryption keys associated with the secure element to a key injection facility server. The service provider server is further configured to receive a service provider certificate generated by a certification authority server. The service provider server is further configured to transmit the service provider certificate to the key injection facility server, whereby the key injection facility server stores the set of encryption keys, one or more attributes associated with the secure element, and the service provider certificate into a memory of the secure element. The activation server is configured to authenticate an identity of the secure element based on one or more parameters of the service provider certificate. The activation server is further configured to generate a session with the secure element based on mutual authentication with the secure element using at least the service provider certificate. The activation server is further configured to activate the secure element of the terminal device by storing at least a master key and a working key into the memory of the secure element.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments that, together with the specification, explain the subject matter.

DETAILED DESCRIPTION

Figure 1:
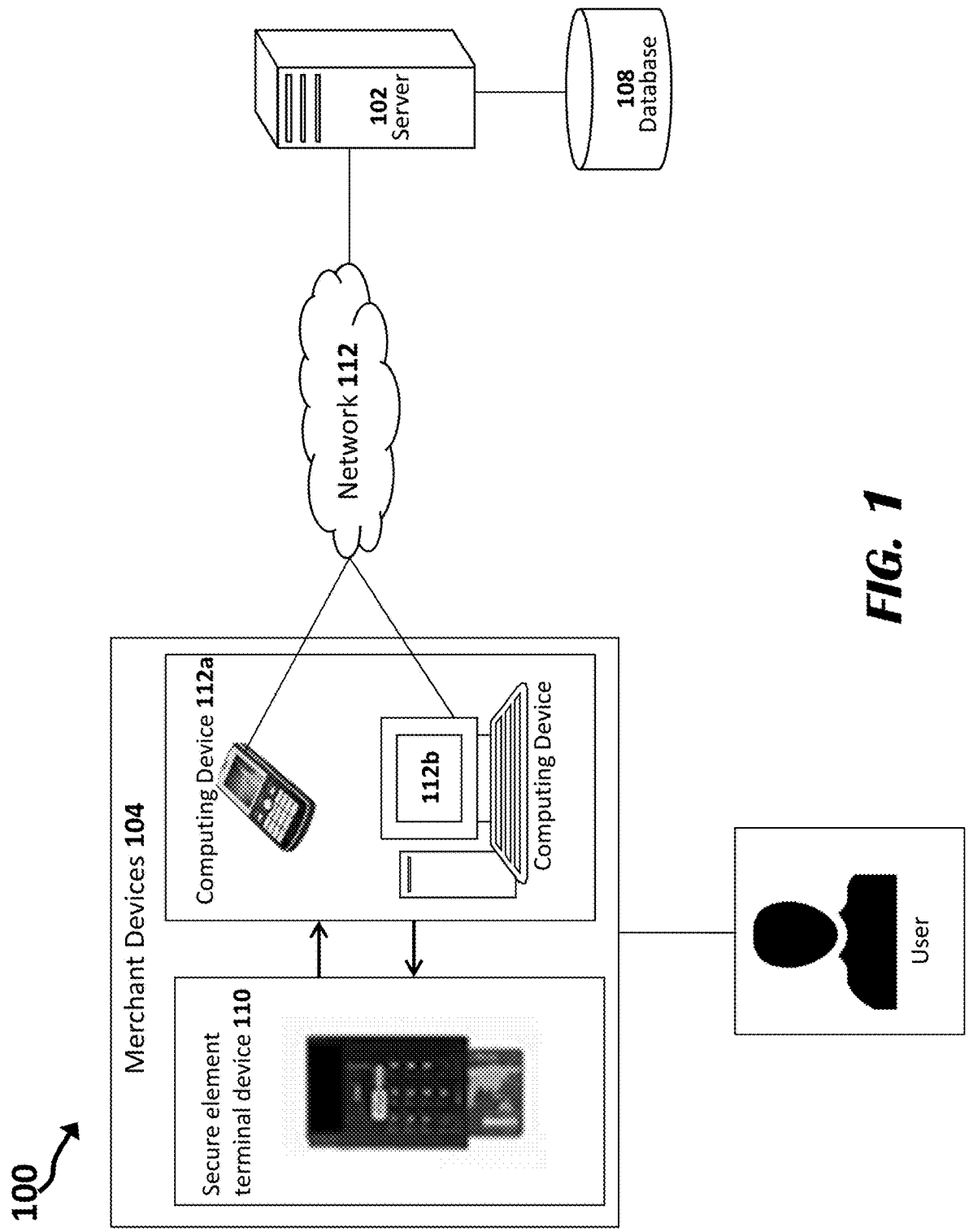
FIG. 1 shows components of a secure communication and/or transaction system, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

In embodiments described herein, a secure element is a tamper-resistant platform, such as a one chip secure microcontroller, capable of securely hosting applications and their confidential and cryptographic data (e.g., key management) in accordance with rules and security requirements set forth by a set of trusted authorities. A secure element may also be a software component emulating a component and providing a trusted storage area and trusted services. A secure element may have a memory, a processor, and an operating system configured to deny access to its resources to an entity, which is not entitled to the secure element. In one example, a UICC (Universal Integrated Circuit Card) is a secure element, which embeds SIM applications for telecommunication purposes.

In some embodiments, a removable secure element may be uniquely associated with its hosting/terminal device as an embedded-secure element. In some cases, the terminal devices may be constituted by computing devices/machines that communicate with other machines for machine-to-machine applications. In one example, a secure element may be installed, fixedly or not, in a terminal, like a payment processing device such as a card reader or a mobile communication device. Merchants may use the terminal devices for financial and payment transactions, and thereby may be provisioned with financial and payment capabilities. For a secure handling of financial and payment activities, the terminal devices may be provided with the secure elements. The secure elements may further use procedures established to promote security of information stored in the secure element, such as personal financial and payment information, merchant profile information relating to available network services, and the merchant's encoded network identification data. The terminal devices with secure elements may store data such as personal financial and payment information, merchant profile information relating to available network services, and the merchant's encoded network identification data in a memory, and then allow for the encrypted communication of the data to provide the merchant users of the terminal device with secure network access and protection from fraud and identity theft, and thereby providing greater business flexibility.

FIG. 1 shows components of a secure communication and/or transaction system 100, according to an exemplary embodiment. The secure communication and/or transaction system 100 may include servers 102, merchant devices 104, and databases 106. The merchant devices 104 may include secure element terminal devices 110 and computing devices 112. The servers 102, the merchant devices 104, the databases 106, secure element terminal devices 110, and computing devices 112 are connected to each other through a network 112. The examples of the network 112 may include, but are not limited to, private or public LAN, WLAN, MAN, WAN, and the Internet. The network 112 may include both wired and wireless communications according to one or more standards and/or via one or more transport mediums. The communication via the network 112 may be performed in accordance with various communication protocols such as Transmission Control Protocol and Internet Protocol (TCP/IP), User Datagram Protocol (UDP), and IEEE communication protocols. In one example, the network 112 may include wireless communications according to Bluetooth specification sets or another standard or proprietary wireless communication protocol. In another example, the network 112 may also include communications via a cellular network, including, e.g. a GSM (Global System for Mobile Communications), CDMA (Code Division Multiple Access), and EDGE (Enhanced Data for Global Evolution) network.

Servers 102 may be any computing device comprising a processor and non-transitory machine-readable storage medium and capable of performing the various tasks and processes described herein during execution. The servers 102 described herein may include a key injection facility server, a service provider server, an activation server, a certification authority server, and a secure element vendor server. Non-limiting examples of the server 102 may include a desktop computer, a mobile device, a server computer, a laptop computer, a tablet computer, and the like. For ease of explanation, FIG. 1 shows a single computing device functioning as the server 102. However, it should be appreciated that some embodiments may comprise any number of computing devices capable of performing the various tasks described herein.

Merchant devices 104 (terminal devices) may be any computing and/or telecommunications device comprising a processor and capable of performing the various tasks and processes described herein, such as providing a GUI interface to a user/customer to interact with the merchant devices 104. Non-limiting examples of the merchant devices/terminal devices 104 may include a secure element terminal device 110 such as a card reader, a mobile device 112a (e.g., POTS landline telephone, cellular telephone, smartphone) having an embedded secure element, a computing device 112b (e.g., desktop, laptop, server, tablet), or any other telecommunications or computing device having an embedded secure element used to communicate with the elements described in system 100. In some embodiments, the secure elements may be any IOT device. The IOT devices may be devices embedded with electronics, software, sensors, actuators, and network connectivity that are inter-networked with each other to enable these devices to collect and exchange data. Each device of the IOT devices may be manufactured by different manufacturers but are able to communicate with each other despite not sharing common application programming interfaces or connection protocols using a unique identifier (for example, a universally unique identifier (UUID) assigned to each of the IOT devices. In one example, a merchant device/terminal device 104 may be an IOT device having an integral secure element or embedded with a secure element that may be used as a parking meter such that the parking meter may be installed on or beneath a road and is able to communicate with a vehicle on the road to exchange vehicle and payment data from a user of the vehicle for payment of the parking fees.

In various embodiments, merchant devices/terminal devices 104 may be a component of a point of sale system that enables a consumer to make a purchase at a merchant, such as with a payment card. The merchant devices/terminal devices 104 may require a PIN number and/or other authentication from the consumer. Such merchant devices/terminal devices 104 may include magnetic card readers (e.g., for reading a payment card, such as a credit card) and near field communication (NFC) devices (e.g., for receiving a consumer's payment information from an electronic device, such as a mobile device).

A merchant device vendor may manufacture a secure element terminal device 110 such as a card reader or a mobile device 112a for use in the methods of the presently disclosed disclosure. In a preferred embodiment, the merchant device vendor may include a card reader or a mobile phone manufacturer; however, the present disclosure is not limited to any specific type of the merchant devices 104. In some embodiments, a merchant device vendor may manufacture, assemble, and test the merchant devices 104 containing the secure elements/secure element chips. In certain embodiments, the secure element chip need not be embedded into the merchant devices 104. The merchant devices 104 described herein, may include the secure elements that are designed to be soldered into printed circuit boards of the merchant devices 104 such as mobile devices. The permanently installed, or terminal-integrated, secure elements stand in contrast to detachable secure elements, which have chips embedded into a card, and the present disclosure can be applied to both the terminal-integrated secure elements and to detachable secure elements such as those in SIM cards. With respect to the secure element, preferred embodiments may use integrated circuit (IC) microprocessor cards, also referred as chip cards. The chip cards may be embedded with a microprocessor and memory to support a variety of applications. The chip cards may have built-in cryptography support, that is, built-in functions to perform storage and manipulation of data, such as large numbers.

Some embodiments of the present disclosure may use other varieties of the secure element besides chip cards. Examples include integrated circuit (IC) memory cards or optical memory cards, which contain memory but no microprocessor. The embodiments using memory cards would rely on a processor of a terminal device such as a card reader or a mobile device for all data processing and would only use the memory of the secure element for the data storage.

In some embodiments, a memory of the secure element may be a non-volatile storage device for storing data and instructions, to be used by a processor. The memory may be implemented with a magnetic disk drive, an optical disk drive, a solid-state device, or an attachment to network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, a memory of the secure element may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In some embodiments, a merchant device vendor assembles and tests the merchant device 104 containing the secure elements. The merchant device manufacturer may then ship the merchant device 104 leaving a factory to a facility that complies with trusted security standards safeguarding PIN security and key management, such as TR39, in a tamper evident carton. In an example, the facility may be a key injection facility (KIF) that may be a secure service facility that injects encryption keys (e.g., symmetric or asymmetric keys) into the merchant device 104. The injected encryption key is used, in particular embodiments, to encrypt data (e.g., merchant data) received by the merchant device 104. While each merchant device 104 may or may not have tamper evident packaging, each merchant device 104 may be inspected at the secure KIF, visually and electronically, without disassembly for tampering.

In some embodiments, a merchant device 104 may have a unique identifier set into irreversible fuses or a secure memory area of the merchant device 104. The unique identifier may be a merchant device manufacturer serial number. When the merchant device manufacturer ships the merchant devices 104, a list of manufacturer serial numbers may be sent to the key (KIF so that the incoming merchant devices 104 may be validated against the secure elements. The merchant device manufacturer may provide the manufacturer serial number list to the (KIF through secure channel of communication.

In some embodiments, secure elements embedded within the merchant device 104 may have hardware initialization interfaces. The hardware initialization interfaces may include but not limited to JTAG, USB, and Contact Reader. The initialization interfaces of the secure elements within the merchant device 104 may be enabled to allow for re-flashing at the KIF. In some embodiments, while the merchant device 104 is in transportation to the KIF, the initialization interface of the secure elements within the merchant device 104 may be shut down.

In some embodiments, the secure elements within the merchant device 104 or the merchant device 104 may have a fully charged battery. The battery may be used to power the secure elements within the merchant device 104 or the merchant device 104. In some embodiments, while the merchant device 104 is in transportation to the KIF, the merchant device 104 may be shipped in a powered off state.

In some embodiments, the merchant devices 104 may be inspected for visual damage or tamper evidence at the KIF. In some embodiments, a random sample of the merchant devices 104 may be selected by a server 102 to visually and physically inspect for visual damage or tamper evidence at the KIF. In some embodiments, if a lot comprising of the merchant devices 104 is damaged, an operator at the KIF may inspect all the merchant devices 104 in detail. In such a case, any damaged or tampered merchant device 104 may be analyzed to investigate causes behind the tampering as well as what corrective actions to take manage the damaged or tampered merchant device 104. In some embodiments, a server 102 may perform verification of the number of the merchant devices 104. The server 102 may then store the results of the verification in a database 108.

In some embodiments, a server 102 may initiate inspection of the merchant devices 104 for tampering at the KIF by retrieving a terminal public key and a manufacturer ID from a memory of the merchant devices 104. In some embodiments, a server 102 described herein may be a key injection facility server. In some embodiments, a server 102 described herein may be a service provider server. The server 102 may then compare manufacturer ID of each of the merchant devices 104 to a master list of IDs stored in the database 108. In some embodiments, a server 102 may retrieve a terminal public key and a manufacturer ID from a memory of the merchant devices 104 through the execution of a command using a USB or other connection mechanism with the memory of the merchant device 104. Once the server 102 retrieves a terminal public key and a manufacturer ID from the memory of the merchant devices 104, and then the terminal public key and the manufacturer ID is matched and validated using the master list of IDs retrieved from the database 108, the server 102 may transmit a command to replace a default manufacturer firmware in the merchant devices 104.

In some embodiments, a manufacturer firmware may be loaded by a server 102 base stations through an initialization interface of the secure elements within the merchant device 104. In some embodiments, a server 102 described herein may be a key injection facility server. In some embodiments, a server 102 described herein may be a service provider server. The access to the server 102 base stations may be controlled to ensure that only correct components are installed within the merchant device 104 which may include a signed firmware image installed on secure elements within the merchant device 104, an application to detect a presence of a secure element connected to the initialization application, and a tool chain for programming a secure element manufacturer base products via an initialization application. For instance, in some embodiments, each secure element is connected to the server 102 base station via one of the hardware initialization interfaces. The application may then detect the connection of a merchant device 104. The content within the flash memory of the merchant device 104 is then erased, and the signed firmware is uploaded (by the server 102) into the flash memory. A server 102 may further perform a connectivity of the merchant device 104 via USB.

Databases 108 are capable of storing information records such as a set of manufacturer ID's in plain format and/or encrypted version containing data fields that are associated with merchant devices 104. The databases 108 are also capable of storing data such as cardholder data and/or sensitive authentication data, such as, but not limited a routing number, a cardholder name, an expiration date, a service code, magnetic stripe data (or chip data), a card security code (e.g., CAV2, CVC2, CVV2, CID, etc.), one or more personal identification (PIN) numbers, and/or PIN blocks. The databases 108 may be in communication with a processor of the server 102, where the processor is capable of executing the various commands of the system 100. In some embodiments, the databases 108 may be part of the server 102. In some embodiments, the databases 108 may be a separate component in communication with the server 102. In some embodiments, a server 102 may access the data within the database 108, for instance, by executing a query command related to a particular set of data required and responsive to the query command; obtain information about the particular set of data.

A database 108 may be hosted on any number of computing devices comprising a non-transitory machine-readable storage medium and capable of performing the various tasks described herein. As shown in FIG. 1, the database 108 may be accessed by the server 102 and other devices of the system 100 via one or more networks 112. The database 108 may be hosted on the same physical computing device functioning as the server 102 and/or functioning as other devices of the system 100. In some embodiments, the database 108 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the server 102 and/or components of the system 100.

Figure 2A:
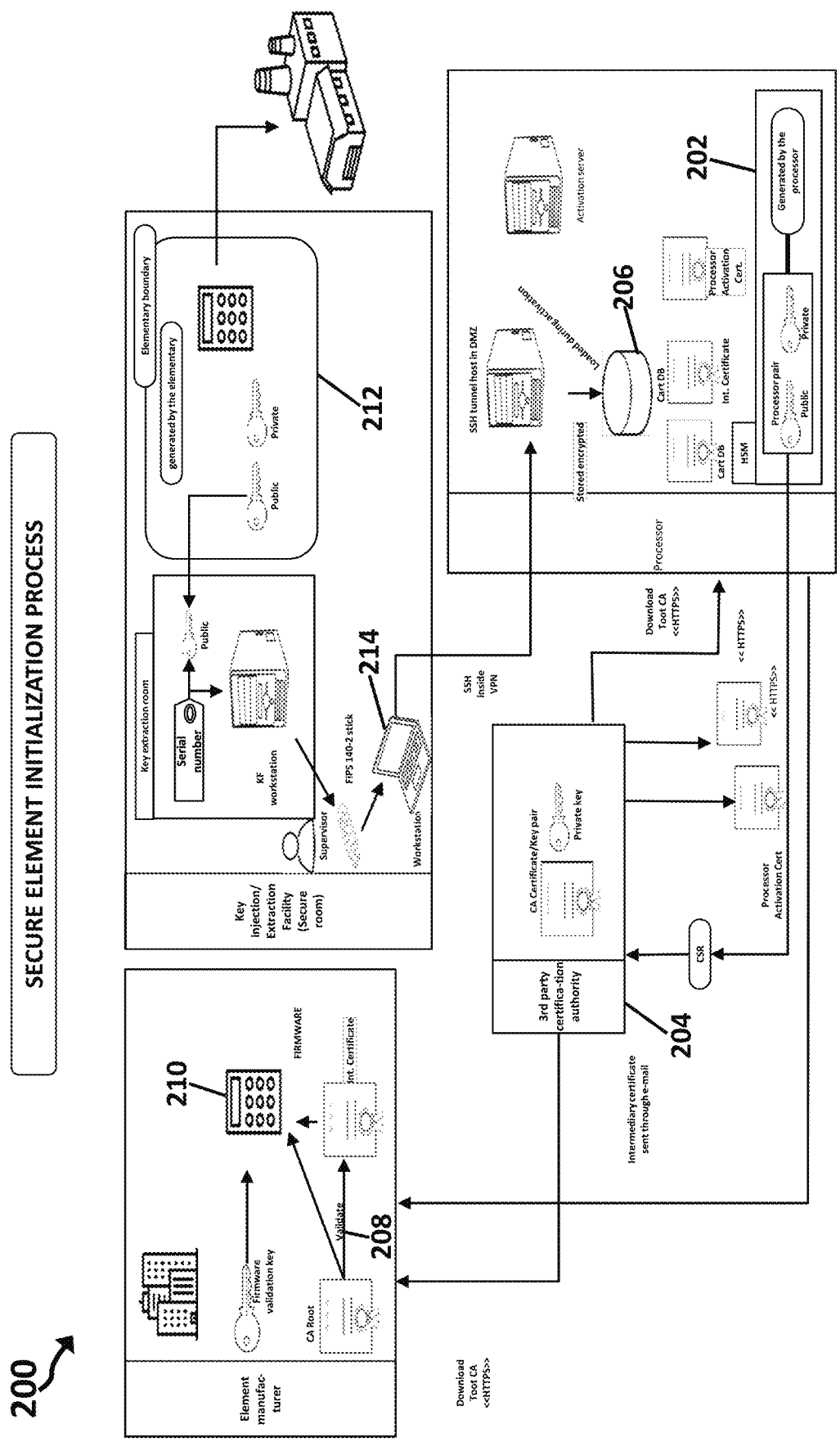
FIG. 2A shows components of a secure communication and/or transaction system for installing and initializing secure element chips for use in merchant devices, according to an exemplary embodiment.
Figure 2B:
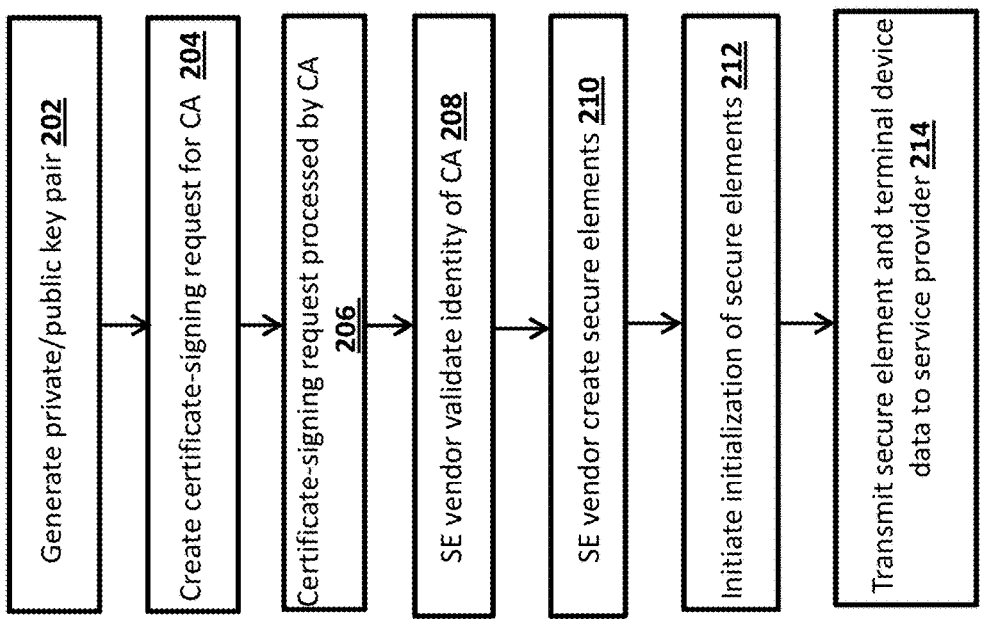
FIG. 2B shows execution of a method of a secure communication and/or transaction system for installing and initializing secure element chips for use in merchant devices, according to an exemplary embodiment.

FIG. 2A and FIG. 2B show execution steps for installing and initializing secure element chips for use in merchant devices, according to an exemplary process 200 of a secure communication and/or transaction system. The exemplary process 200 shown in FIG. 2A and FIG. 2B comprises execution steps 202, 204, 206, 208, 210, 212, and 214. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another.

In addition, an exemplary initialization process 200 of the secure elements of FIG. 2A and FIG. 2B is described as being executed by a service provider server computer via one or more server-based base stations in this exemplary embodiment. However, one having skill in the art will appreciate that, in some embodiments, steps may be executed by any number of servers/computing devices such a key injection facility server, a certification authority server etc. operating in a net use distributed model environment of a secure transaction and/or communication system. In some cases, a service provider server computer executing one or more steps may be programmed to execute various other, unrelated features, where such service provider server computer does not need to be operating strictly as the service provider server computer described herein.

An access to the one or more server-based base stations may be controlled by one or more service provider servers to ensure only correct components are installed in the one or more server-based base stations, which may include but not limited to, an application reading a list of manufacturer serial numbers installed through a USB port into the server-based base stations and an application to interface with one or more initialization hardware modules for initializing terminal devices with secure elements. The one or more initialization hardware modules may include a barcode reader and a USB device interface.

In some embodiments, a server (e.g., a secure element manufacturing server) transmits a list of manufacturer serial numbers for many of the secure elements to be initialized into the service provider server-based base stations. A server (e.g., a secure element manufacturing server) may also execute instructions for application of a serial number label to each secure element. Each secure element in a lot of secure elements is then inserted into server-based base stations (or an initialization station) corresponding to a service provider where an initialization process occurs. The initialization process may include following execution steps for initialization of the secure elements, however, it should be appreciated that other embodiments may comprise additional or alternative execution steps for initialization of the secure elements, or may omit one or more steps altogether. It should also be appreciated that other embodiments may perform certain execution steps for initialization of the secure elements in a different order; steps may also be performed simultaneously or near-simultaneously with one another. In a first step, a barcode device reads a secure element serial number mentioned on a label (for example, sticker) on the secure element. The secure element serial number obtained via the barcode device is then uploaded by a server into a memory of the secure element. The secure element may then transmit its manufacturer ID to the server-based base stations. If the server-based base stations determine that the manufacturer ID received from the secure element is on a list of manufacturer's ID stored in a database, server then injects into the secure element a public key of a service provider, which is associated with a private key. The server then stores the public key in the memory of the secure element. Upon obtaining the public key, the secure element then generates its own key pair. The secure element further transmits the manufacturer ID, the secure element serial number, and its public key to the server-based base stations. The server-based base station stores the manufacturer ID, the secure element serial number and public key in a database. Upon completion of the execution steps for initialization of the lot of the secure elements, the list stored on the server-based base stations (or an initialization station) is made available on one or more servers. A service provider may then retrieve the list from the one or more servers.

In some embodiments, during initialization process of secure elements, in a first step 202, a secure connection between a merchant user and a server is established using public key cryptography systems where digital key pairs having a private key and public key are used to authenticate the entities. The digital key pairs, encryption key pairs may also be used to encrypt data being sent between entities within a computer network or within a wireless network.

In some embodiments, a secure socket layer protocol may be generated that comprises a handshake procedure that uses public-key encryption to establish the generation of a private symmetric key for the two parties. In this protocol, it may be required depending upon the needs of the server, for the merchant user to authenticate itself. The authentication may be performed by use of a certificate, which an electronic document is used to identify a merchant user, a server, or other entity to associate that identity with a public key. A Certification Authority (CA) may issues a private-public key pair to a merchant user based upon the published policies of the CA and upon generation of the private-public key pair, the public key is available for anyone's use and the private key is known only to the merchant user for purposes of decryption and sometimes, encryption. In some embodiments, a server of a service provider may generate a private/public key pair, and a CA may then sign the public key. The private key may be stored in a database of the service provider. The certificate issued by the CA may be used for authenticating the service provider to the secure element.

In a next step 204, a server of a service provider may generate a certificate-signing request and transmit the certificate-signing request to the CA via a transmission secure channel. The certificate-signing request may include verification information. For instance, the certificate-signing request may include a subject field of the certificate (which is an electronic document) that contains service provider's specific parameters that the secure element may use for identifying service provider's activation server during the activation process of the secure element.

In a next step 206, the CA receives the certificate-signing request transmitted to the CA and the CA may process the information of the certificate-signing request. The CA may determine whether to approve the certificate-signing request based on a result of the processing and validation of the identity of the service provider. The CA may grant an approval when the CA approves the certificate-signing request. The CA may then generate and issue a certificate associated with the entity when the approval is received, and the certificate may be transmitted to the server of a service provider or stored in a database and/or website of the CA. In some embodiments, the certificate may be deployed on an activation server of the service provider, which is used for authentication and activation of the secure element.

The CA generates the certificate for public keys of the private/public key pair to certify that a named subscriber genuinely owns the keys. Standards available from the International Organization Standardization, may define typical certificate content generated by the CA. In some embodiments, the certificates issued by the CA enables multiple communicating parties such as merchant user, service provider, and servers to establish confidentiality, message integrity, and authentication without having to exchange any secret information prior to the communication. The certificates issued by the CA may typically include, but not limited to, public key information, identification information, information describing a period of validity of the certificate, and a digital signature of the certificate. The identification information may further include, for example, name information, and address information, location information, phone number information, and the like. The identification information may be associated with a merchant user, or with a server computer or other entity.

In a next step 208, a secure element (SE) vendor/manufacturer may download a root certificate from the CA website/database to validate the identity of the CA. Root certificates are the certificates issued by a CA to itself. In some embodiments, a service provider may also transmit an intermediary certificate to the secure element vendor/manufacturer. The secure element vendor/manufacturer may then validate the intermediary certificate with the root certificate of the CA.

In a next step 210, a secure element vendor/manufacturer manufactures secure element. In some embodiments, secure element vendor/manufacturer manufactures terminal devices containing secure element chips. In some embodiments, a device vendor manufactures terminal devices such as mobile devices and a card reader, and the secure element vendor/manufacturer manufactures secure element and embed into the terminal device obtained from the device vendor. In certain embodiments, the secure element chip may not be embedded into the terminal device, and rather the terminal device may comprise secure elements that are designed to be soldered into the printed circuit boards of the terminal device such as the mobile devices. Upon the creation of the secure elements, a serial number and a manufacturer, ID is assigned to each secure element. The serial number, manufacturer ID, and manufacturer firmware are then stored into a memory of the secure element.

In a next step 212, a process for the initialization of secure element is initiated by the server at a facility that complies with trusted security standards safeguarding PIN security and key management such as TR39. In one example, the facility may be a KIF. During the key injection process in the secure element at the KIF, a server computer of the KIF executes a key injection application. The key injection application may be designed and provided to a server computer at the KIF for firmware injection. The key injection application may be a software program or an algorithm, is co-developed by a secure element manufacturer or a service provider, and contains all the modules that manage the process of key injection in the secure element. The key injection application upon execution by a server computer may perform the initialization of the secure element using a serial number and a root CA public key. For instance, a serial number may be selected by a server computer from a collection of serial numbers provided to the KIF and stored in a database. A collection list of serial numbers may be provided as an input to the key injection application being executed by a server computer during the key injection process in the secure element at the KIF. The serial number is then recorded in an outgoing file, which may be created by server computer executing the key injection application during the key extraction procedure. The file may record information about the secure element. The file may be created as a csv format file that may contain one record per terminal device. The server computer executing the key injection application may name the file, and the name of the file may include a key injection facility name, a batch number, a number of secure elements, and a timestamp when the server computer completed the file.

As part of the key injection process in the secure element at the KIF, a server computer initiates a secure element private/public key generation. Upon the generation of the private/public key, key information is extracted from the secure element. For example, key information extracted may include secure element generated public key, manufacturing ID, injected serial number, and timestamp. The extracted information from the secure element is then stored in a file within a server computer that is used to execute the key injection application. Lastly, a key injection application executed by a server computer may issue a command for locking (fusing) the data of the secure element. The locking of the data of the secure element seals the secure element and prevents the data within the secure element to be overwritten. The server computer after processing a batch of the secure elements may generate a record file that will contain records of data for all the secure elements that have been injected with keys and thereby initialized. The file generated by the server computer is then shared with a service provider via a secure communication channel. In some embodiments, after the initialization of the secure element, the secure element may be dispatched to a distribution center. The secure element is then forwarded through distribution channels to merchant users.

In a next step 214, the server computer extracts a public key of a terminal device from a memory of a secure element. The server computer then stores the public key together with the serial number in a database, and transmits the public key together and the serial number to a service provider via a mutually authenticated secure transmission channel. A server computer of a service provider may then encrypt the public key and store in a database of the service provider.

In certain embodiments, during the initialization process 200 of the secure elements, certificates and encryption keys that are used in order to encrypt and decrypt sensitive data and messages are transmitted to and from the secure element. A server computer may generate a hierarchy of certificates and corresponding private keys involved in a process of manufacturing of secure elements to enforce security throughout the secure communication and/or transaction system. For example, a hierarchy of certificate and corresponding private keys may be used by a server computer for creating a security framework that establishes trust between all entities involved in execution of a secure communication and/or transaction system that provides merchant users with an ability to perform credit and debit card data capture and for transmitting the data via a network, such as the Internet, in a secure manner. In secure communication and/or transaction process, a secure element is responsible for reading the card data, and immediately encrypting the card data for transmission to sever of service providers.

Figure 3A:
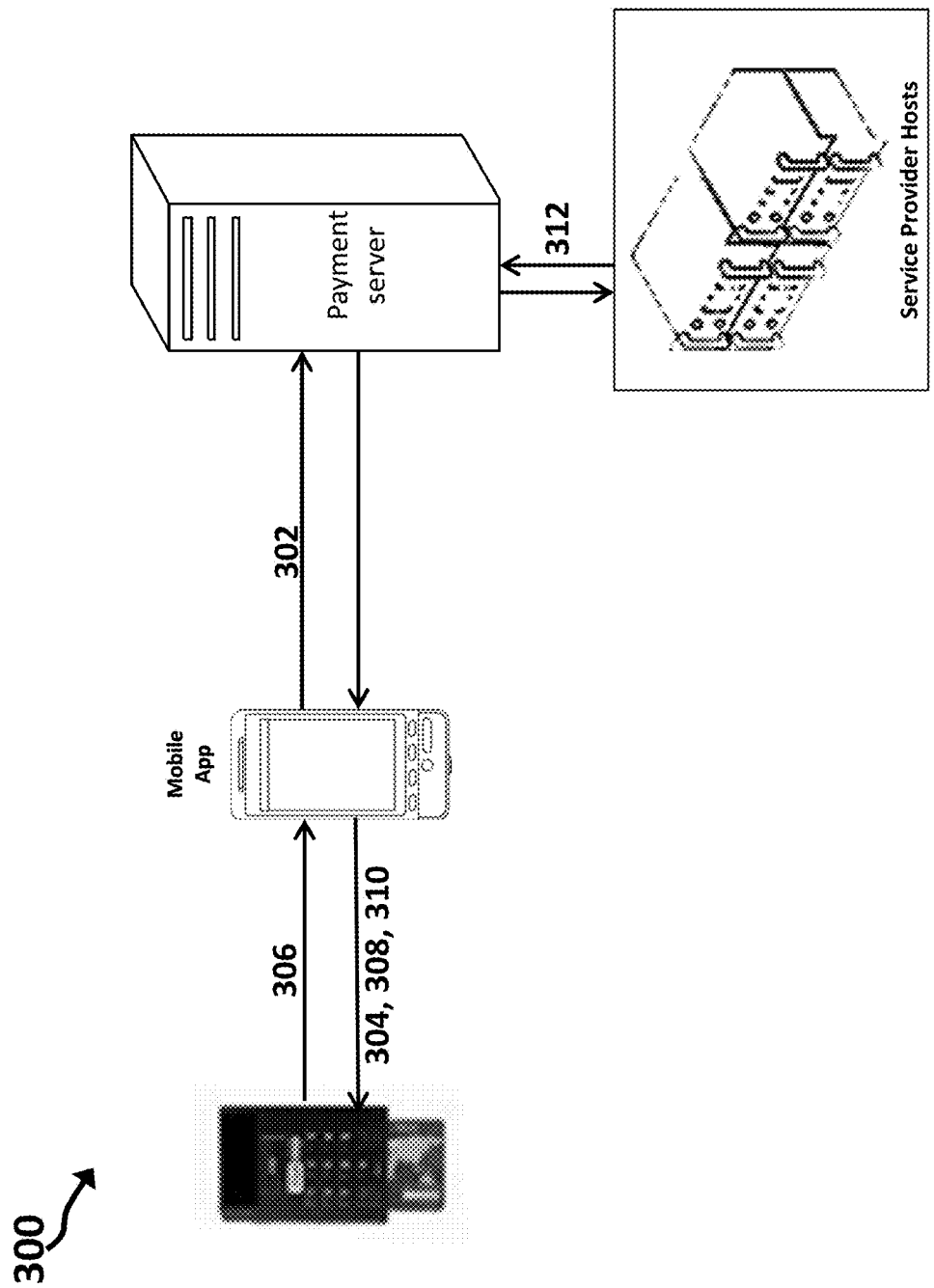
FIG. 3A shows components of a secure communication and/or transaction system for activating secure element chips for use in merchant devices, according to an exemplary embodiment.
Figure 3B:
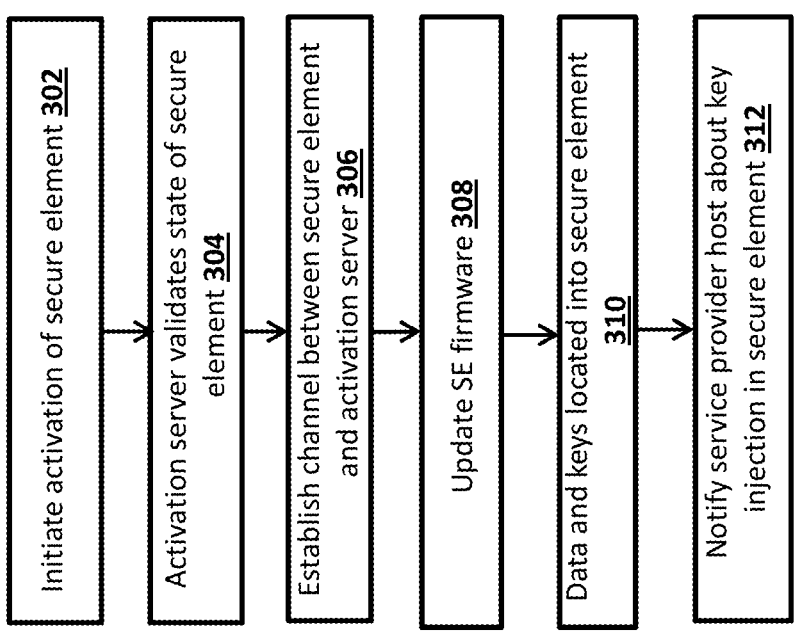
FIG. 3B shows execution of a method of a secure communication and/or transaction system for activating secure element chips for use in merchant devices, according to an exemplary embodiment.

FIG. 3A and FIG. 3B show execution steps for activating secure element chips for use in merchant devices, according to an exemplary process 300 of a secure communication and/or transaction system. The exemplary process 300 shown in FIG. 3A and FIG. 3B comprises execution steps 302, 304, 306, 308, 310, 312, and 314. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another.

In addition, an exemplary activation process 300 of the secure elements of FIG. 3A and FIG. 3B is described as being executed by a single activation server computer in this exemplary embodiment. However, one having skill in the art will appreciate that, in some embodiments, steps may be executed by any number of servers/computing devices operating in a net use distributed model environment. In some cases, an activation server computer executing one or more steps may be programmed to execute various other, unrelated features, where such server computer does not need to be operating strictly as the server computer described herein.

In a first step 302, on receiving a secure element comprising a unique authentication key, a CA root, and intermediary certificate coming from a factory, a server computer such as mobile device execute a mobile application that initiates a process of the activation of the secure element with an activation server. The mobile device may transmit information retrieved from a secure element (installed in a card reader) such as a unique authentication key, a CA root, and intermediary certificate to the activation server.

In a next step 304, an activation server may execute instructions to check a status of the secure element embedded in a card reader. The status checking by the activation server involves determining whether the secure element is ready for activation. Upon determining that the secure element is ready for activation, the activation server may validate ready status of a secure element. In some embodiments, the activation server may transmit the ready status of the secure element to a mobile application installed on a mobile device.

In a next step 306, a mobile device executes the mobile application to establish a communication and transmission channel between the activation server and the secure element. In some embodiments, a communication and transmission channel between the activation server and the secure element is a proxy channel.

In a next step 308, an activation server may determine whether secure element firmware has to be updated. The activation server on determining that the secure element firmware has to be updated initiates the update process of the secure element. In some embodiments, the activation server then establishes a SCP (Secure Channel Protocol) asymmetric session between the secure element and the activation server. During the SCP (Secure Channel Protocol) asymmetric session between the secure element and the activation server, the activation server may pass an activation certificate to the secure element. A processor of the secure element may then initiate a process to validate the activation certificate based on one or more parameters. The one or more parameters may include but not limited to determining by the processor whether the activation certificate is signed by a same CA based on a root certificate loaded into the secure element during the manufacturing process of the secure element, and whether a subject line of the activation certificate contains a service provider's domain address. In some embodiments, the processor of the secure element may initiate the process to validate the activation certificate based on a certificate chain instead of a single root certificate. In some embodiments, the processor of the secure element may initiate the process to validate the activation certificate based on multiple certificate chains instead of a single chain. The domain address may be stored in a memory data area of the secure element firmware, and is signed so that the domain address can be reasonably trusted. An activation server then retrieves the certificate from the database and uses the certificate for authenticating the secure element. A secure element firmware is then uploaded into the secure element within the established SCP (Secure Channel Protocol) asymmetric session and the secure element is rebooted.

In a next step 310, a secure element may get an initial data and keys loaded into its memory. The loading process is composed of several steps. One of the steps in a loading process may include establishment of a SCP (Secure Channel Protocol) asymmetric session between a terminal device comprising a secure element and an activation server. In some embodiments, a SCP (Secure Channel Protocol) asymmetric session is established between a terminal device comprising a secure element and an activation server for a crypto officer. The SCP (Secure Channel Protocol) asymmetric session uses private keys and corresponding certificates for mutual authentication and signed ephemeral public key (such as X509 cert signed by Activation Private key) to establish the shared session. One or more secure element master keys are then injected into the secure element and the secure element master key is encrypted with asymmetric session keys. The one or more secure element master keys loaded into a secure element embedded with the terminal device may include a secure element master MAC key, a secure element master communication key, a secure element master PIN key, a secure prompt MAC key, DUKPT base derivation key, any other protocol base key, or master key. Upon loading of the one or more secure element master keys into the secure element embedded with the terminal device, the secure element is initialized with configuration parameters, and one or more working keys are loaded into the secure element. The one or more working keys may include but not limited to a secure element working terminal PIN key, a secure element working MAC key, and a secure element working communication key. Next, one or more service provider master keys are loaded into the secure element embedded with the terminal device. The one or more service provider master keys may include but not limited to a service provider master MAC key, a service provider master communication key, and a service provider master PIN Key.

In a next step 312, an activation server transmits a notification to a service provider via a secure communication channel to a service provider host about an injection of the one or more service provider master keys into the secure element embedded within the activation device. In some embodiments, the activation server may also transmit PID ID and terminal device ID (TID) to the service provider host.

In some embodiments, after the secure element is activated, a transaction flow is initiated from a point of sale (POS) system comprising a terminal device having a secure element. After the initiation of the transaction flow, transaction data is exchanged between the entities of the POS system and service provider host system. The transaction data exchanged between the entities of the POS system and the service provider host system may be encrypted using one or more transaction working keys. The one or more transaction working keys may be initially loaded (by the server) into the secure element through a protocol such as SPDH protocol wrapped with corresponding service provider master keys. The one or more transaction working keys may include a service provider working transaction PIN key, a service provider working communication key, and a service provider working MAC key. The service provider working transaction PIN key may be used for encrypting a pin. The service provider working communication key may be used for encrypting a protocol data. The service provider working MAC key may be used for authenticating the protocol data. In some embodiments, the one or more transaction working keys such as a service provider working transaction PIN key, service provider working communication key, and the service provider working MAC key may be rotated before every transaction session starts. In some embodiments, the one or more transaction working keys such as a service provider working transaction PIN key, service provider working communication key, and the service provider working MAC key may be rotated after a pre-defined time-period. The pre-define time period may be set based on different set of conditions. One such condition may be that the one or more transaction working keys such as a service provider working transaction PIN key, service provider working communication key, and the service provider working MAC key may be rotated after a pre-defined time period (for example, at least once a day). Another such condition may be that the one or more transaction working keys such as a service provider working transaction PIN key, service provider working communication key, and the service provider working MAC key may be rotated after occurrence of pre-defined number of transactions (for example, 200 transactions).

In some embodiments, a process for initiation of a transaction flow from a point of sale (POS) system comprising a computing device such as a mobile device having a mobile POS application and a terminal device such as a card reader having a secure element may include initiating a transaction by executing the POS application installed on the mobile device. The execution of the POS application on the mobile device instructs the secure element of the card reader to initiate a card read within the card reader. The secure element then encrypts transaction data read from the card using one or more service provider session working keys. The secure element then transmits the transaction data to a POS application solution server. The POS application solution server then transmits the transaction data a service provider host system. In an embodiment, the card transaction data submitted to the service provider host system as part of a transaction is formatted and encrypted completely on the secure element, and then the card transaction data traverses though the POS application completely unchanged and thereby providing end-to-end encryption. The service provider host system on receipt of the transaction data processes the transaction data, and based on results of the processing of the transaction data; generate a response for the POS application solution server. In one instance, during the processing of the transaction data if the service provider host system determine a that one or more session keys have to be rotated, then a new set of session keys is provided as part of the transaction response to the POS application solution server. The POS application solution server on receiving a response from the service provider host system, analyzes the received response, and then generates a transaction validation response and transmits it to the POS application on the mobile device. The POS application on the mobile device on receipt of the transaction validation response may transmit the transaction validation response in a message to the secure element of the card reader. In some embodiments, if the one or more session keys have to be rotated by the POS application solution server, the POS application solution server may then generate instructions to initiate a process of updating one or more session keys of the service provider. The session keys are then updated in the secure element. The secure element, using corresponding master keys of the updated session keys, unwraps the updated session keys and stores the updated session keys in a memory of the secure element. In some embodiments, only the session keys may unwrap the updated session keys, because after the injection of the master keys into the secure element is completed, only the secure element and the service provider host have access to master keys.

In some embodiments, a process for delivery of approval and validation prompt messages to a terminal device comprising a secure element is described. The approval and validation messages may be delivered a terminal device comprising a secure element upon a time of activation of the secure element as well as at a later stage when any authorized party make any changes. The process for delivery of approval and validation messages to the terminal device comprising the secure element may include defining of the messages by assigning each message with a corresponding unique id. Some of the messages may be marked with a corresponding flag. After defining the messages, the messages are then composed into a file and then verified. A prompt signature private key then signs the composed and validated file containing the messages. The signing process of the composed and validated file containing the messages is executed on a server computer. In order to execute the signing process of the composed and validated file containing the messages on the server computer, the composed and validated file containing the messages are then transmitted to the server computer. The server computer then signs the file and validates the signature before storing the file in a database or files storage unit. When the messages are to be injected to the secure element, the messages are loaded from the file and injected into the secure element. Prior to the injection of the messages into the secure element, the server computer validates the file containing the messages. In an embodiment, each message that is marked with a flag has a MAC value calculated using corresponding MAC key. The MAC value for the whole file is also calculated. The file is then sent to a terminal device. The terminal device receives the file and validates the MAC value for the file and for each marked message in the file. The terminal device then recalculates the MAC values using local storage key and stores the calculated MAC values in a flash memory of the secure element. In instances when the secure elements have to display a message, the secure element may load the message from the flash memory and validates the MAC value prior to displaying the message.

In some embodiments, a process for updating a terminal device firmware is disclosed. Prior to the terminal device firmware can be delivered by a firmware vendor, a vendor certificate is sent to a service provider via a secure communication channel such as an email or any other channel. A CA may first sign the certificate so that the service provider can validate the certificate. The certificate is then uploaded to a POS application solution server. The POS application solution server may then validate the certificate against a root certificate of the CA that is installed on the POS application solution server. When the terminal device firmware is uploaded on the POS application solution server, the POS application solution server loads a vendor certificate and validates a firmware signature. The secure element public key is then injected into the secure element at a KIF when the secure element is initialized. The firmware vendor then creates a new version of the firmware and signs the new version of the firmware using signature private key of a firmware vendor. The terminal device firmware is then shipped to a service provider server for uploading the terminal device firmware onto the service provider server. The terminal device firmware then validates the terminal device firmware and stores the terminal device firmware for later upload of the terminal device firmware on the secure element. In an embodiment, when the service provider server detects that the terminal device firmware on the secure element has to be updated, the service provider server calculates the signature for the terminal device firmware using the secure element signature key and uploads the signature for the terminal device firmware into the secure element. The secure elements then restart and upon restarting of the secure element, the secure element validates the signature. If the signature is valid, terminal device with the secure element boots using new terminal device firmware.

In some embodiments, Europay, Mastercard, and Visa (EMV) are a payment system specification for credit/debit chip cards and devices designed to perform credit/debit transactions using these chip cards. In an EMV transaction, there are mainly three parties involved: a buyer or user who is the cardholder, a merchant, and a bank or other financial institution that is the EMV issuer. The buyer initiates the EMV transaction by inserting an EMV compliant chip card (or a device that uses the chip card) into an EMV payment terminal (having a secure element) at the merchant. The payment terminal may be, for example, a Point of Sale (POS) terminal equipped with a chip card-reader and EMV access software. This payment terminal obtains the user, chip card information, and sends the information to the EMV issuer to be processed. The EMV issuer processes the information and completes the EMV transaction by crediting the merchant and debiting the buyer's account accordingly. For EMV systems, EMV keys are injected into an EMV payment terminal for implementation of the EMV systems. The process of the EMV keys injection into an EMV payment terminal may consists of a process where when a new EMV key pack is available, a server computer downloads an EMV key set from a service provider. The server computer then calculates a signature for an EMV key pack. The server computer then uploads the key pack together with the signature into a POS application server for later injections into secure elements. The POS application server stores the key pack together with the signature in a database. In an embodiment, when the secure element is connected and the POS application server determines that the secure element has an outdated service provider EMV keys pack, the POS application server initiates a SCP (Secure Channel Protocol) asymmetric session with the secure element. The POS application server further wraps the EMV keys with SCP session keys, and then the keys are loaded into a memory of the secure element encrypted with a user storage key.

Figure 4:
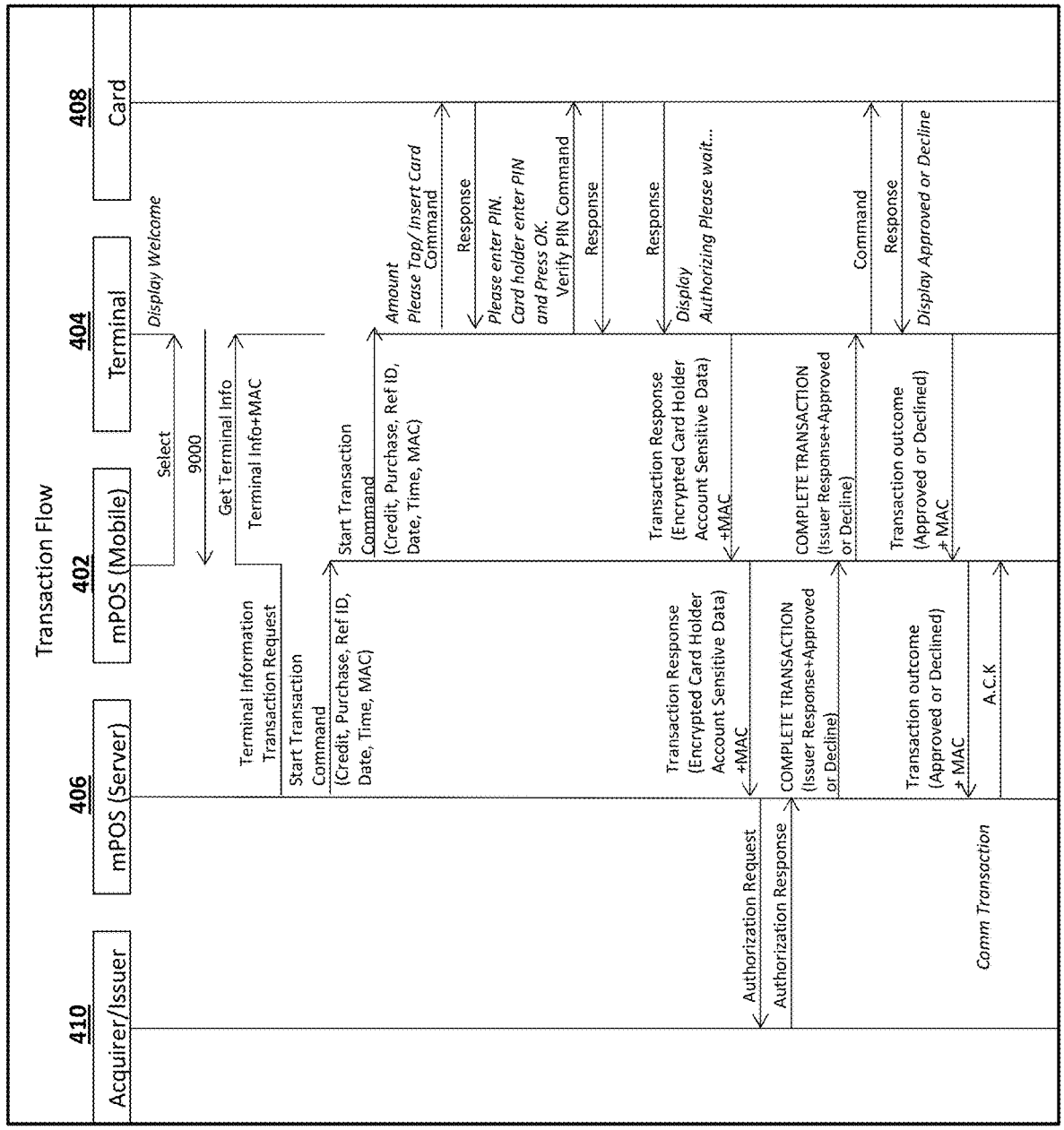
FIG. 4 shows a transaction flow process for performing transactions in a secure communication and/or transaction system, according to an exemplary embodiment.

FIG. 4 shows a transaction flow method 400 for performing transactions in a secure communication and/or transaction system, according to an exemplary embodiment. A terminal 404 may for performing transactions in a secure communication and/or transaction system. The terminal 404 may be a processor based secure card reading device. The terminal 404 may include a plurality of processors where a first processor may be used as secure crypto service provider and a second processor may be used to perform application functionality. The terminal 404 may be able to read magnetic stripe, contact, and contactless cards. The cards can be used for credit and debit transaction (both EMV and non-EMV). The cards may support a purchase, a refund, a void and a cash back transaction. A host may be able to communicate to the terminal 404 using communication channels such as USB and Bluetooth.

In an embodiment, for performing transactions in a secure communication and/or transaction system, a merchant user initiates a transaction using a point of sale application (mPOS) 402 installed on a mobile device. The point of sale application (mPOS) 402 may then read a terminal 404 information and forward the information read from the terminal 404 to an point of sale application server (mPOS server) 406 along with transaction data such as transaction amount. The point of sale application server (mPOS server) 406 generates a command to start a transaction and transmits the transaction command to the point of sale application (mPOS) 402. The point of sale application (mPOS) 402 may then transmit the transaction command to the terminal 404. The terminal 404 may then read a card user account data from user's card 408 and take a PIN number from the card data. The terminal 404 may then encrypt card user account data with service provider keys and prepare a MAC. The terminal 404 then transmits the transaction response to the point of sale application server (mPOS server) 406 through the point of sale application (mPOS) 402. The point of sale application server (mPOS server) 406 then verify the MAC and forward the MAC to a service provider (issuer/provider) 410. The service provider (issuer/provider) 410 then validate the transaction and send a final decision to the terminal 404 through the point of sale application server (mPOS server) 406 and the point of sale application (mPOS) 402.

Figure 5:
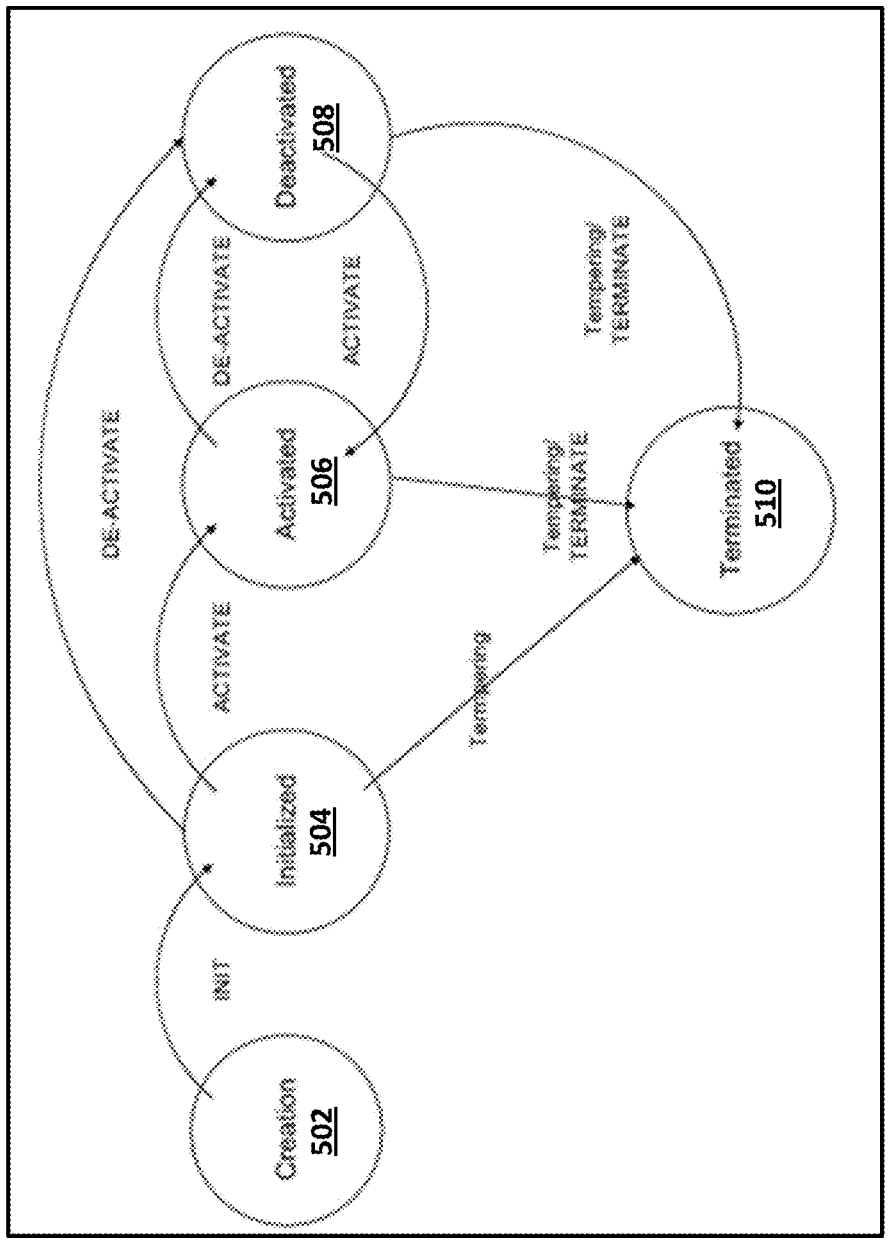
FIG. 5 shows a life cycle states of a terminal of a secure communication and/or transaction system, according to an exemplary embodiment.

FIG. 5 shows a life cycle states 500 of a terminal of a secure communication and/or transaction system, according to an exemplary embodiment. The life cycle states 500 of the terminal of the secure communication and/or transaction system may include a creation state 502, an initialized state 504, an activated state 506, a deactivated state 508, and a terminated state 510. The creation state 502 is a first state of a terminal device after manufacturing of the terminal device. In the creation state 502 of the terminal device, there will be no keys inside the terminal device. In the initialized state 504 of the terminal device, application and transaction keys will be loaded in the terminal device. In the activated state 506 of the terminal device, a terminal state command will be updated in the terminal device to switch the terminal device to the activated state. The terminal device is ready for transactions in the activated state 506. In the deactivated state 508 of the terminal device, a terminal state command will be updated in the terminal device to switch the terminal device to the deactivated state. The terminal device is disabled in the deactivated state 508. In the terminated state 510 of the terminal device, a terminal state command will be updated to switch the terminal device to a terminated state. In the terminated state 510 of the terminal device, all keys will be erased and no commands are allowed.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for initialization and activation of a secure element for use in a terminal device, the method comprising:
   generating, by at least one service provider server, a set of encryption keys associated with the secure element;
   transmitting, by the at least one service provider server, the set of encryption keys associated with the secure element to a key injection facility server;
   receiving, by the at least one service provider server, a service provider certificate from a certification authority server;
   transmitting, by the at least one service provider server via the key injection facility server, the service provider certificate, the set of encryption keys, and one or more attributes associated with the secure element to the secure element;
   generating, by a processor of the secure element, a public key corresponding to the service provider certificate and the set of encryption keys;
   receiving, by the at least one service provider, an activation request from the secure element at a time later than transmitting the service provider certificate, the set of encryption keys, and one or more attributes to the secure element;
   authenticating, by the at least one service provider server, an identity of the secure element by:
      extracting the public key from the secure element and determining whether the extracted public key corresponds to one or more parameters of the service provider certificate;
   generating, by the at least one service provider server, a session with the secure element based on mutual authentication with the secure element using at least the service provider certificate, wherein the service provider server transmits an activation certificate to the secure element; and
   validating, by the processor of the secure element, the activation certificate by determining that the activation certificate is associated with the certification authority server;
   in response to the processor of the secure element validating the activation certificate, loading, by the at least one service provider server, at least a master key and a working key into the memory of the secure element.

2. The method according to claim 1, wherein the one or more attributes associated with the secure element comprises a manufacture ID of a vendor of the secure element, whereby the at least one service provider server uses the one or more attributes to authenticate the secure element by comparing the manufacture ID of the vendor of the secure element with a manufacture ID of a vendor of the secure element stored within a database.

3. The method according to claim 1, further comprising uploading, by the at least one service provider server, a firmware of a vendor of the secure element into the memory of the secure element.

4. The method according to claim 1, wherein the set of encryption keys comprises a private key and a public key, and wherein the private key is stored in a database of a service provider.

5. The method according to claim 1, wherein the activation certificate comprises a subject field with the one or more parameters associated with a service provider server, whereby the processor of the secure element validates the activation certificate by determining whether the subject field comprises a domain address associated with the certification authority server.

6. The method according to claim 1, wherein the secure element is a printed circuit board of the terminal device, wherein the terminal device is selected from a group consisting of a card reader, a mobile phone, a vending machine, a wearable device, or an internet of things (TOT) device.

7. The method according to claim 1, wherein the secure element is detachably connected to the terminal device, and wherein the secure element comprises a processor and a memory for storing data.

8. A system for initialization and activation of a secure element for use in a terminal device, the system comprising:
   a service provider server comprising a processor and a non-transitory computer-readable medium containing instructions that when executed by the processor causes the processor to perform operations comprising:
      generate a set of encryption keys associated with the secure element;
      transmit the set of encryption keys associated with the secure element to a key injection facility server;
      receive a service provider certificate from a certification authority server;
      transmit, via the key injection facility server, the service provider certificate, the set of encryption keys, and one or more attributes associated with the secure element to the secure element;

receive an activation request from the secure element at a time later than transmitting the service provider certificate, the set of encryption keys, and one or more attributes to the secure element;

authenticate an identity of the secure element by:
  extracting a public key from the secure element and determining whether the extracted public key corresponds to one or more parameters of the service provider certificate;

generate a session with the secure element based on mutual authentication with the secure element using at least the service provider certificate, wherein the service provider server transmits an activation certificate to the secure element; and in response to the processor of the secure element validating the activation certificate, load at least a master key and a working key into the memory of the secure element; and wherein the secure element comprises a second non-transitory computer-readable medium containing instructions that when executed by the processor of the secure element causes the processor of the secure element to perform operations comprising:

generate the public key corresponding to the service provider certificate and the set of encryption keys;
  validate the activation certificate by determining that the activation certificate is associated with the certification authority server.

9. The system according to claim 8, wherein the secure element is a printed circuit board of the terminal device, wherein the terminal device is selected from a group consisting of a card reader, a mobile phone, a vending machine, a wearable device, or an internet of things device.

10. The system according to claim 8, wherein the secure element is detachably connected to the terminal device, and wherein the secure element comprises a processor and a memory for storing data.

11. The system according to claim 8, wherein the one or more attributes associated with the secure element comprises a manufacture ID of a vendor of the secure element.

12. The system according to claim 8, wherein the encryption keys comprises a private key and a public key and wherein the instructions further cause the processor of the service provider server to store the private key in a database of the service provider.

* * * * *